May 22, 1962 A. ZAROUNI 3,036,290

ERROR RATE ALARM CIRCUIT

Filed Nov. 12, 1959

INVENTOR
A. ZAROUNI
BY R C Lipton
ATTORNEY

United States Patent Office 3,036,290
Patented May 22, 1962

3,036,290
ERROR RATE ALARM CIRCUIT

Alfred Zarouni, Brooklyn, N.Y., assignor to Bell Telephone Laboratories, Incorporated, New York, N.Y., a corporation of New York Filed Nov. 12, 1959, Ser. No. 852,571
13 Claims. (Cl. 340—147)

Figures 1, 2:
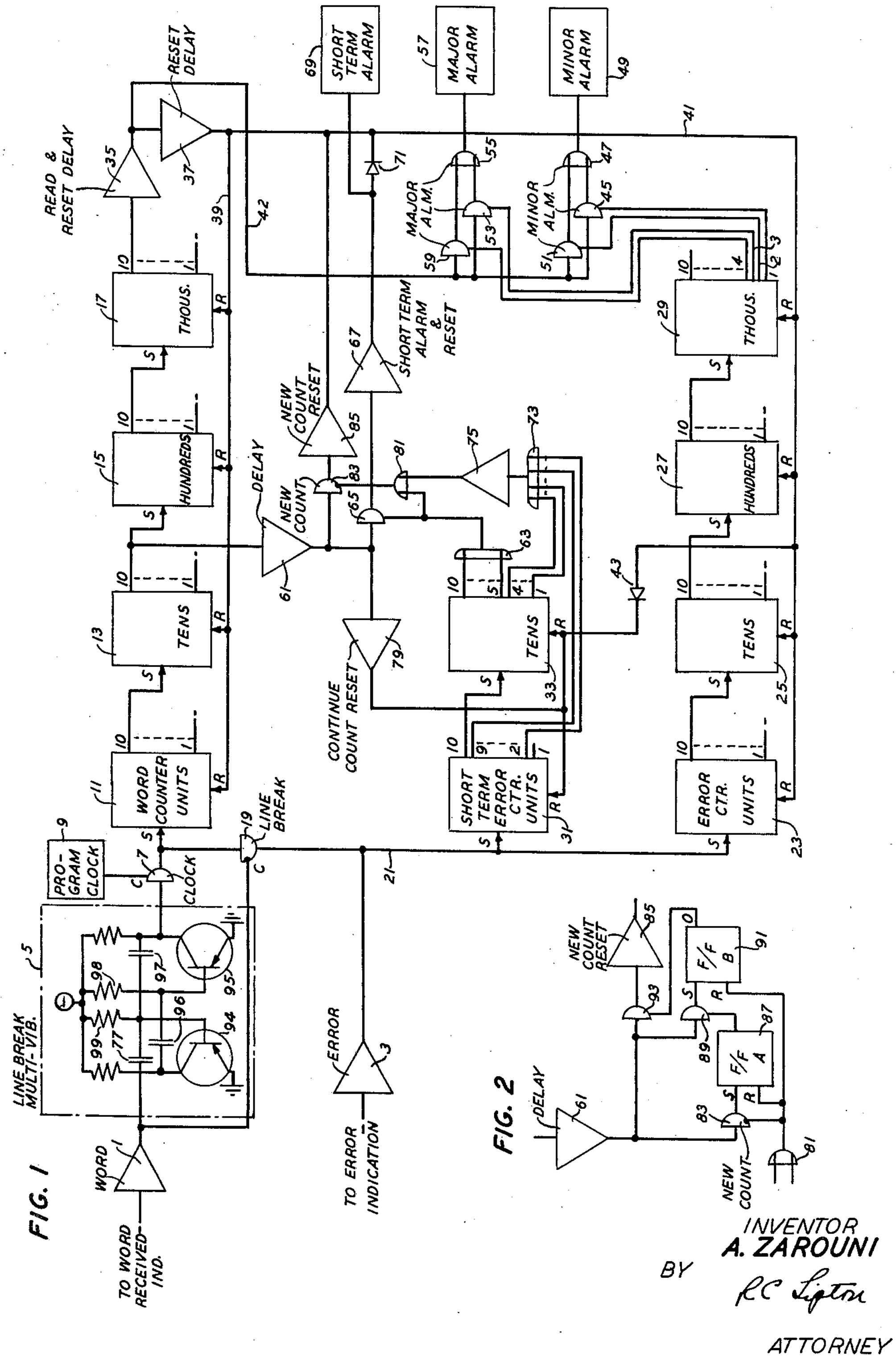

This invention relates to data transmission systems and particularly to arrangements for determining the error performance of data transmission systems.

In data systems, it is desirable to determine whether received data signals are substantially error free. The occurrence of errors in received data is determined by error-detecting apparatus which provides an indication for each error detected. In certain previous systems of the type wherein maintenance attention may be required due to noisy transmission channels, etc., the performance of the system is determined by observing the error rate of the received data. In these systems the error indications are counted and means are provided to disclose the number of errors received during a predetermined observation period.

It is a broad object of this invention to provide an improved circuit for indicating the error rate performance of a system.

It is another object of this invention to provide an improved counting circuit for comparing the number of pulses from a source of random pulses with a source of standard pulses.

Another object of this invention is to maintain a running average of the error performance.

It is another object of this invention to terminate an observation period and initiate a new observation period if a substantially error-free interval occurs whereby the observation period will not be weighted on the low side by the error-free interval.

It is a further object of this invention to simulate a high error rate performance if a major failure, such as a line break, occurs.

A further object of this invention is to terminate an observation period and initiate a new observation period when a predetermined number of successive error-free intervals occurs.

In accordance with a specific embodiment of the invention disclosed herein, a word counter is arranged to provide an observation period during each cycle thereof. The word counter is advanced by pulses from a free-running pulse generator which is maintained in synchronism with the received data words or characters. Pulses derived from the error indications are applied to an error counter and a short-term counter. In the event that the count of the error counter exceeds a predetermined number at the conclusion of a cycle of the word counter, an alarm is raised. The word counter and the error counter are reset at the termination of the cycle.

The short-term counter provides a running count of the error pulses during portions of each word counter cycle and is reset at the conclusion of each portion. If the short-term count exceeds a predetermined number, an alarm is raised and all of the counters are reset. In addition, to preclude weighing an observation period on the low side by a substantially error-free interval, the short-term counter resets all the counters if substantially no errors are detected through the duration of any one of the portions of the word counter cycle.

The output pulses of the pulse generator are also applied to a gate whose output extends to the input of the short-term counter. During the reception of data information, an inhibiting control voltage is applied to the gate whereby the passage of pulses therethrough is normally blocked. In the event, however, that a major system failure occurs, such as a line break whereby the reception of data signals is interrupted, the control voltage is removed from the gate. Since the pulse generator is free running and therefore continues to generate pulses, the word counter and the short-term counter are advanced simultaneously whereby a high error rate performance is simulated in the short-term counter.

In accordance with a modification of the specific embodiment of the invention, the counters are not reset by a low short-term error performance until three successive portions of the word counter cycle are substantially error free. If two successive portions are error free, an enabling voltage is stored on the control terminal of a normally disabled gate. If the third or next successive portion is error free, a pulse is applied via the enabled gate to reset all the counters. In the event, however, that one of the portions is not error free, the enabling voltage is removed and the gate is restored to its normally disabled condition.

The means for fulfilling the foregoing objects and the practical embodiments of the features of this invention will be fully understood from the following description taken in conjunction with the accompanying drawings wherein:

FIG. 1 shows a circuit arranged to determine the error performance of a data system; and FIG. 2 shows a modification of a portion of the embodiment of FIG. 1 wherein means are provided to initiate a new observation period after a plurality of error-free intervals.

Referring now to FIG. 1, a word amplifier generally indicated by triangular block 1 amplifies positive pulses applied thereto. The input of word amplifier 1 is connected to a word received indicator, not shown. Word received indication apparatus is well known in data systems and may function to cooperate with receiving apparatus to generate a positive pulse after the reception of each word by the receiving apparatus. Accordingly, each pulse applied to amplifier 1 represents the reception of a word which in data systems comprises a combination of bits or elements. It is to be understood, however, that the circuit is not restricted to data systems and may cooperate, for example, with teletypewriter systems whereby each pulse would represent the reception of a teletypewriter code character.

Error amplifier 3, whose input is connected to an error indicator, not shown, amplifies positive pulses applied thereto. Error indicator or detector apparatus is well known in the art and may function to cooperate with the receiving apparatus to generate a positive pulse when an error is detected in a received word or code combination. Accordingly, each pulse applied to amplifier 3 represents the detection of an error in a received word.

It is thus seen that a pulse is applied to the input of amplifier 1 upon the reception of each word and in the event that an error is detected in the word, a pulse is substantially simultaneously applied to amplifier 3.

The output of amplifier 1 extends to line break multivibrator 5. Multivibrator 5 is a conventional, synchronized, free-running pulse generator or oscillator. When an amplified positive pulse is applied to multivibrator 5, a positive pulse is generated at the output thereof. In the event that the input pulses are removed, multivibrator 5 continues to supply output pulses.

In general, multivibrator 5 includes transistors 94 and 95. Assuming that transistor 94 starts to conduct or turns on, its collector voltage is driven in a positive direction and a positive pulse is applied to the base of transistor 95 by way of capacitor 96 whereby transistor 95 is rendered nonconductive or turns off. The positive charge on capacitor 96 now proceeds to discharge by way of resistor 98. After a predetermined interval, determined by the capacitance of capacitor 96 and the resistance of resistor 98, the charge on capacitor 96 discharges sufficiently to lower the base voltage of transistor 95 below the emitter voltage whereby transistor 95 turns on. When transistor 95 turns on, its collector voltage which was previously at a negative potential is raised substantially to ground and a positive pulse is applied by way of capacitor 97 to the base of transistor 94, turning off transistor 94. The positive charge on capacitor 97 now discharges by way of resistor 99 to negative battery and when capacitor 97 discharges sufficiently to lower the base voltage of transistor 94 below its emitter voltage, transistor 94 turns on and the above-described cycle is repeated. The values of capacitors 96 and 97 and resistors 98 and 99 are arranged so that the duration of each cycle is longer than the duration between each of the word pulses when data is being received at the normal rate.

Assuming now a positive word pulse is obtained from the output of amplifier 1, as previously described, this pulse is applied by way of capacitor 77 to the base of transistor 94 whereby transistor 94 is turned off. The collector voltage of transistor 94 which is substantially at ground potential when transistor 94 is conducting, now goes negative, whereby a negative pulse is applied by way of capacitor 96 to the base of transistor 95, turning on transistor 95. As described above, when transistor 95 turns on, its collector voltage is driven in a positive direction and a positive pulse is applied by way of capacitor 97 to the base of transistor 94 which at this time is turned off. The charge on capacitor 97 now proceeds to discharge, as described above, and transistor 94 subsequently turns on and transistor 95 turns off. Capacitor 96 now proceeds to discharge. However, assuming that word pulses are being applied to multivibrator 5 at the normal rate, before capactor 96 discharges sufficiently to turn transistor 95 back on, a word pulse is applied from the output of amplifier 1 by way of capacitor 77 to the base of transistor 94 whereby transistor 94 is turned off and transistor 95 is turned on. Accordingly, while word pulses are being applied to multivibrator 5 at the normal rate, transistor 95 turns on upon the application of each word pulse, generating a positive pulse at the output of multivibrator 5.

The positive pulse output of multivibrator 5 is supplied through enabling clock gate 7 to inhibiting line break gate 19 and to units word counter 11. The enabling gate 7, the inhibiting gate 19, the counter 11, as well as OR gates, flip-flops, amplifiers and delay amplifiers, hereinafter described, are well known in the art and described, for example, in Patent 2,812,385 granted to A. E. Joel, Jr., et al. on November 5, 1957.

The enabling gate 7 is a three-terminal gate which normally blocks the passage of positive pulses. When, however, an enabling voltage is applied to its control terminal C, the passage of positive pulses through gate 7 is enabled. The control terminal C of gate 7 is connected to program clock 9. Program clock apparatus is well known in the art and may function to provide an enabling voltage during predetermined periods of time. Program clock 9 is arranged to provide an enabling voltage during periods which correspond to the intervals when the system is programed to accept data. It is thus seen that a pulse is applied to counter 11 and to gate 19 by way of gate 7, by multivibrator 5 during the predetermined intervals that data is being transmitted to the receiving apparatus.

Inhibiting gate 19 is a three-terminal gate which normally allows the passage of positive pulses. When, however, a positive pulse is applied to its control terminal C, the passage of positive pulses through gate 19 is inhibited. Control terminal C of gate 19 is connected to the output of amplifier 1. Accordingly, if the positive pulse applied to gate 19 is in response to the word pulse output of amplifier 1, gate 19 is inhibited and the pulse is not gated therethrough.

Counter 11 is a ring counter having ten bistable stages. When a stage is enabled by an input pulse at terminal S, the previous stage is reset and the succeeding stage is prepared in anticipation of the next input pulse. Accordingly, each of the tens stages of counter 11 are successively enabled in response to ten input pulses whereby counter 11 maintains a unit count of input pulses. The tenth stage of counter 11 is connected to the input of counter 13. Counter 13 is a ring counter substantially similar to counter 11. Since an input pulse is applied to counter 13 for each ten input pulses applied to counter 11, counter 13 maintains the tens count of the input pulses. Similarly, the tenth stage of counter 13 is connected to the input of counter 15 and the tenth stage of counter 15 is connected to the input of counter 17 whereby counters 15 and 17 maintain the hundredths and thousandths counts, respectively, of the input pulses. Initially, the tenth stage of each of counters 11, 13, 15 and 17 is enabled and when another one of the stages is enabled, a pulse applied to reset terminal R, as described hereinafter, restores the counter to the initial condition. Accordingly, the word counter is arranged to provide a 10,000 word series observation period.

The output of error amplifier 3 is connected by way of lead 21 to the input of error counter 23 and the input of short-term counter 31. Error counter 23 is substantially similar to word counter 11 and maintains the unit count of error pulses. Similarly, counter 25 which is connected to the tenth stage of counter 23, counter 27 which is connected to the tenth stage of counter 25, and counter 29 which is connected to the tenth stage of counter 27, maintain the tens, hundredths and thousandths counts, respectively, of the error pulses. Short-term error counter 31 is also substantially similar to word counter 11 and maintains the units count of error pulses, and counter 33 which is connected to the tenth stage of counter 31 maintains the tens count of error pulses.

The tenth stage of counter 17 is connected to the input of read and reset delay amplifier 35. When 10,000 word pulses are counted, the tenth stage of counter 17 is enabled, as previously described, whereby a pulse is applied to amplifier 35 which in turn supplies a pulse to reset delay amplifier 37. Amplifier 37 in turn applies a pulse by way of lead 39 to the reset terminals of counters 11, 13, 15 and 17 whereby the counters are reset. In addition, amplifier 37 applies a pulse by way of lead 41 to the reset terminals of counters 23, 25, 27 and 29 and to the reset terminals of counters 31 and 33 by way of diode 43 whereby counters 23, 25, 27, 29, 31 and 33 are reset when 10,000 word pulses are counted.

As previously described, the error counter, comprising counters 23, 25, 27 and 29, maintains a count of the number of error pulses. This count is compared with the count of word counter 17 to activate an alarm in the event that the number of errors exceeds a predetermined amount.

Assuming now that at the conclusion of a 10,000 word series, at least 1,000 but less than 2,000 errors have been counted, enabling gate 45 is enabled by a pulse from the enabled first stage of counter 29. The output pulse of amplifier 35 is thus applied by way of lead 42, through gate 45 and OR gate 47 to minor alarm circuit 49, thereby activating the minor alarm. Similarly, in the event that at least 2,000 but less than 3,000 errors are counted, enabling gate 51 is enabled by the positive voltage applied thereto by the enabled second stage of counter 29 whereby the output pulse of amplifier 35 is applied by way of lead 42, gate 51 and OR gate 47 to alarm circuit 49, activating the alarm circuit.

OR gate 47 is a gate which allows the passage of positive pulses applied to an input terminal to the output terminal of the gate. Minor alarm circuit may comprise any well-known type of alarm, buzzer, etc., arrangement whereby upon being activated, a visual or audible signal is operated.

In the event that at least 3,000 but less than 4,000 errors are counted, the enabled third stage of counter 29 applies a positive pulse to enabling gate 53 whereby the output pulse from amplifier 35 is applied by way of lead 42, gate 53 and OR gate 55 to major alarm circuit 57. Similarly, if the number of counted errors is at least 4,000 but less than 5,000, enabling gate 59 is enabled and the pulse on lead 42 is applied by way of gate 59 and OR gate 55 to major alarm circuit 57.

It is thus seen that a minor alarm is raised if a series of 10,000 words contains between 1,000 and 2,999 errors, while a major alarm is raised if the series contains between 3,000 and 4,999 errors.

Short-term error counters 31 and 33 provide a running comparison of the number of errors for each series of 100 words. The tenth stage output of the word tens counter 13 is connected to the input of delay amplifier 61. When 100 words are counted by the word counter, the enabled tenth stage of counter 13 provides a pulse which is applied to delay amplifier 61 which in turn applies the pulse by way of the continue count reset amplifier 79 to the reset terminals of short-term counters 31 and 33. Therefore, counters 31 and 33 are reset at the termination of each 100 word count.

The output of each of stages 5 through 10 of counter 33 extends to the input of the OR gate 63 whereby a pulse is applied to OR gate 63 in the event that 50 errors or more are detected at the termination of each 100 word series. OR gate 63 passes the pulse to the control terminal of enabling gate 65 and the pulse provided at the output of delay amplifier 61 in response to the enabling of stage 10 of counter 13 is passed through enabled gate 65 and short-term alarm and reset amplifier 67 to short-term alarm circuit 69, thereby providing an audible or visual indication in substantially the same manner as previously disclosed in regard to alarm circuit 49. In addition, the pulse produced at the output of amplifier 67 is applied by way of diode 71 to leads 39 and 41. As previously described, the application of a pulse to leads 39 and 41 resets all of the counters. Accordingly, in the event that 50 or more errors are detected during each 100 word series, an alarm indication is provided by circuit 69 and all the counters are reset.

If the system is substantially error free during a 100 word series, it is desirable to reset all the counters so that the 10,000 word series will not include the periods of error-free transmission. To provide for the new count reset, the outputs of stages 2 through 9 of counter 31 and 1 through 4 of counter 33 extend to OR gate 73 and the output of OR gate 73 extends in turn to OR gate 81 by way of amplifier 75. In addition, the output of OR gate 63 extends to the input of OR gate 81. Accordingly, a pulse is applied to the control terminal of the new count inhibiting gate 83 by OR gate 81 in the event that the number of errors counted by short-term error counters 31 and 33 exceeds one error.

Delay amplifier 61 applies a pulse to the input of inhibiting gate 83 at the termination of each 100 word series. If the error count at the termination of the 100 word series exceeds one error whereby an inhibiting pulse is applied to the control terminal of gate 83, the output pulse of delay amplifier 61 cannot pass therethrough. Assuming, however, that the number of errors does not exceed 1, an inhibiting pulse is not applied to gate 83 and the output pulse of delay amplifier 61 is passed through gate 83 to leads 39 and 41 by way of new count reset amplifier 85 whereby all of the counters are reset.

The circuit is arranged to provide a short-term alarm in the event that a system failure, such as a line break, occurs and data is not received during an interval when the system is programed to accept data. It is recalled that multivibrator 5 produces pulses which are passed by way of gate 7 to the input terminal of counter 11 and the input of inhibiting gate 19. It is further recalled that gate 19 is normally inhibited by word pulses provided at the output of amplifier 1. Assuming now that a line break occurs, amplifier 1 will not supply inhibiting pulses to the control terminal of gate 19. However, since multivibrator 5 is free running, as previously described, the multivibrator 5 continues to generate output pulses which now pass through gate 19 to the input terminal of counter 31 by way of lead 21. Since the output pulses of multivibrator 5 are also being applied to the input terminal of counter 11, short-term counters 31 and 33 will advance to the tenth stage of counter 33 at the same time that the tenth stage of counter 13 is enabled.

As previously described, the enabling of the tenth stage of counter 33 at the termination of a 100 word series activates short-term alarm circuit 69 and resets all the counters. Accordingly, a line break will cause pulses to be applied simultaneously to the word counter and the short-term error counter whereby a high error rate is simulated and a short-term alarm is activated.

It may be desirable to reset the counters if the system is substantially error free for three successive 100 word series rather than resetting the system after 100 words, as previously described. Referring now to FIG. 2, reference numeral 61 designates the delay amplifier 61 previously referred to in FIG. 1. Similarly, gate 83, gate 81 and amplifier 85, FIG. 1, are designated by similar reference numerals in FIG. 2. Delay amplifier 61 provides a pulse to new count inhibiting gate 83 at the conclusion of each 100 word series, as previously described. In addition, OR gate 81 provides an inhibiting pulse to gate 83 in the event that the error count for the 100 word series exceeds one error. Assuming now that the system is substantially error free for the 100 word series, the inhibiting pulse is not applied to gate 83 and the output pulse of delay amplifier 61 is passed through gate 83 to the set terminal of flip-flop 87 whereby flip-flop 87 is set from its normal condition to its enabled condition. The enabling of flip-flop 87 stores an enabling voltage on the control terminal of enabling gate 89.

If the next 100 word series is again substantially error free, the output pulse of delay amplifier 61 is passed through gate 89 to flip-flop 91. Flip-flop 91 is set to its enabled state whereby an enabling voltage is stored on the control terminal of enabling gate 93. If the third 100 word series is again substantially error free, the output pulse of delay amplifier 61 is applied by way of enabling gate 93 to new count reset amplifier 85. As previously described, the application of a pulse to new count reset amplifier 85 provides a pulse to leads 39 and 41 whereby all of the counters are reset.

In the event that the second or third 100 word series includes two or more errors, a pulse is provided at the output of OR gate 81, as previously described. The output of OR gate 81 extends to the reset terminal of flip-flops 87 and 91 and the pulse applied through OR gate 81 resets flip-flop 87 to its initial condition and resets flip-flop 91 if it had previously been placed in the set condition. The restoring of flip-flops 87 and 91 removes the enabling voltages applied to the control terminals of gates 89 and 93, respectively. The circuit is thus restored to its initial condition.

Although specific embodiments of the invention have been shown and described, it will be understood that various modifications may be made without departing from the spirit of this invention and within the scope of the appended claims.

What is claimed is:

1. In a circuit for comparing the number of pulses from a first and second source, a first multistage pulse counter operably responsive to pulses from said first source, a second multistage pulse counter operably responsive to pulses from said second source, a third multistage pulse counter operably responsive to pulses from said second source, indicating means jointly responsive to the operation of a final one of said stages of said first counter and a predetermined one of said stages of said second counter for indicating a condition, other indicating means jointly responsive to the operation of an intermediate one of said stages of said first counter and a final one of said stages of said third counter for indicating a condition, a first reset means responsive to the operation of said final stage of said first counter for resetting said first and second counters, a second reset means responsive to the operation of said intermediate stage of said first counter for resetting said third counter, a third reset means jointly responsive to the operation of said intermediate stage of said first counter and said final stage of said third counter for resetting said first and second counters, a fourth reset means effective upon the operation of an initial one of said stages of said third counter for resetting said first and second counters in response to the operation of said intermediate stage of said first counter, and means effective in the absence of pulses from said first source for simultaneously applying pulses to said first and third counters.

2. In a circuit for comparing the number of pulses from a first and second source, a first multistage pulse counter operably responsive to pulses from said first source, a second multistage pulse counter operably responsive to pulses from said second source, a third multistage pulse counter operably responsive to pulses from said second source, indicating means jointly responsive to the operation of a final one of said stages of said first counter and a predetermined one of said stages of said second counter for indicating a condition, other indicating means jointly responsive to the operation of an intermediate one of said stages of said first counter and a final one of said stages of said third counter for indicating a condition, a first reset means responsive to the operation of said final stage of said first counter for resetting said first and second counters, a second reset means responsive to the operation of said intermediate stage of said first counter for resetting said third counter, a third reset means jointly responsive to the operation of said intermediate stage of said first counter and said final stage of said third counter for resetting said first and second counters, and a fourth reset means effective upon the operation of an initial one of said stages of said third counter for resetting said first and second counters in response to the operation of said intermediate stage of said first counter.

3. In a circuit for comparing the number of pulses from a first and second source, a first multistage pulse counter operably responsive to pulses from said first source, a second multistage pulse counter operably responsive to pulses from said second source, a third multistage pulse counter operably responsive to pulses from said second source, indicating means jointly responsive to the operation of a final one of said stages of said first counter and a predetermined one of said stages of said second counter for indicating a condition, indicating means jointly responsive to the operation of an intermediate one of said stages of said first counter and a predetermined one of said stages of said third counter for indicating a condition, a first reset means responsive to the operation of said final stage of said first counter for resetting said first and second counters, a second reset means responsive to the operation of said intermediate stage of said first counter for resetting said third counter, and a third reset means jointly responsive to the operation of said intermediate stage of said first counter and said predetermined stage of said third counter for resetting said first and second counters.

4. In a circuit for comparing the number of pulses from a first and second source, a first multistage pulse counter operably responsive to pulses from said first source, a second multistage pulse counter operably responsive to pulses from said second source, a third multistage pulse counter operably responsive to pulses from said second source, indicating means jointly responsive to the operation of a final one of said stages of said first counter and a predetermined one of said stages of said second counter for indicating a condition, a first reset means responsive to the operation of said final stage of said first counter for resetting said first and second counters, a second reset means responsive to the operation of said intermediate stage of said first counter for resetting said third counter, and a third reset means jointly responsive to the operation of said intermediate stage of said first counter and a predetermined one of said stages of said third counter for resetting said first and second counters.

5. In a circuit for comparing the number of pulses from a first and second source, a first multistage pulse counter operably responsive to pulses from said first source, a second multistage pulse counter operably responsive to pulses from said second source, a third multistage pulse counter operably responsive to pulses from said second source, indicating means jointly responsive to the operation of a final one of said stages of said first counter and a predetermined one of said stages of said second counter for indicating a condition, other indicating means jointly responsive to the operation of an intermediate one of said stages of said first counter and a final one of said stages of said third counter for indicating a condition, and means effective in the absence of pulses from said first source for simultaneously applying pulses to said first and third counters.

6. In a circuit for indicating the ratio of pulses from a source of random pulses with a source of standard pulses, a first multistage pulse counter, a second multistage pulse counter, a third multistage pulse counter, a free-running pulse generator for applying pulses to said first counter, means responsive to said random pulse source for applying pulses to said second and third counters, indicating means jointly responsive to a final one of said stages of said first counter and a predetermined one of said stages of said second counter for indicating a condition, other indicating means jointly responsive to an intermediate one of said stages of said first counter and a final one of said stages of said third counter for indicating a condition, further means for applying pulses from said pulse generator to said third counter, and means responsive to pulses from said standard pulse source for inhibiting said further means.

7. In a circuit for indicating the ratio of pulses from a source of random pulses with a source of standard pulses, a first multistage pulse counter, a second multistage pulse counter, a free-running pulse generator for applying pulses to said first counter, means responsive to said standard pulse source for applying synchronizing pulses to said pulse generator, means responsive to said random pulse source for applying pulses to said second counter, means jointly responsive to a predetermined one of said stages of said first counter and a corresponding one of said stages of said second counter for indicating a condition, and means effective in the absence of pulses from said standard pulse source for applying pulses from said pulse generator to said second counter.

8. In a circuit for indicating the ratio of pulses from a source of random pulses with a source of standard pulses, a first multistage pulse counter, a second multistage pulse counter, a free-running pulse generator for applying pulses to said first counter, means responsive to said random pulse source for applying pulses to said second counter, means jointly responsive to a predetermined one of said stages of said first counter and a corresponding one of said stages of said second counter for indicating a condition, further means for applying pulses from said pulse generator to said second counter, and means responsive to pulses from said standard pulse source for inhibiting said further means.

9. In a circuit for indicating the ratio of pulses from a source of random pulses with a source of standard pulses, a first multistage pulse counter, a second multistage pulse counter, a free-running pulse generator for applying pulses to said first counter, means responsive to said standard pulse source for applying synchronizing pulses to said pulse generator, means responsive to said random pulse source for applying pulses to said second counter, means jointly responsive to a predetermined one of said stages of said first counter and a corresponding one of said stages of said second counter for indicating a condition, further means for applying pulses from said pulse generator to said second counter, and means responsive to pulses from said standard pulse source for inhibiting said further means.

10. A circuit for comparing the number of pulses from a source of random pulses with a source of standard pulses comprising, a first multistage pulse counter operably responsive to pulses from said standard pulse source, a second multistage pulse counter operably responsive to pulses from said source of random pulses, a first reset means responsive to the operation of a predetermined one of said stages of said first counter for resetting said second counter, further means responsive to the operation of said predetermined stage of said first counter for storing a condition, a second reset means for resetting said first counter, additional means jointly responsive to said stored condition and the subsequent operation of said predetermined stage of said first counter for operating said second reset means, and means responsive to the operation of a predetermined stage of said second counter for inhibiting said further means and said additional means.

11. A circuit for comparing the number of pulses from a source of random pulses with a source of standard pulses comprising, a first multistage pulse counter operably responsive to pulses from said standard pulse source, a second multistage pulse counter operably responsive to pulses from said source of random pulses, a first reset means responsive to the operation of a predetermined one of said stages of said first counter for resetting said second counter, means effective upon the operation of an initial one of said stages of said second counter for storing a condition in response to the operation of said predetermined stage of said first counter, a second reset means for resetting said first counter, normally disabled means effective upon the operation of said initial stage of said second counter for operating said second reset means in response to the next successive operation of said predetermined stage of said first counter, and means responsive to said stored condition for enabling said normally disabled means.

12. A circuit for comparing pulses from a source of random pulses with a pulse standard comprising, a first multistage pulse counter operably responsive to pulses from said standard, a second multistage pulse counter operably responsive to pulses from said source of random pulses, a first reset means responsive to the operation of a predetermined one of said stages of said first counter for resetting said second counter, further means responsive to the operation of said predetermined stage of said first counter for storing a condition, a second reset means for resetting said first counter, additional means jointly responsive to said stored condition and the subsequent operation of said predetermined stage of said first counter for operating said second reset means, and means responsive to the operation of a predetermined one of said stages of said second counter for deleting said stored condition.

13. A circuit for comparing the number of pulses from a source of random pulses with a source of standard pulses comprising, a first multistage pulse counter operably responsive to pulses from said standard pulse source, a second multistage pulse counter operably responsive to pulses from said source of random pulses, a first reset means responsive to the operation of a predetermined one of said stages of said first counter for resetting said second counter, means for storing a condition in response to the operation of said predetermined stage of said first counter, a second reset means for resetting said first counter, gate means enabled by said stored condition for operating said second reset means in response to the next successive operation of said predetermined stage of said first counter, and further means responsive to the operation of a predetermined one of said stages of said second counter for deleting said stored condition.

References Cited in the file of this patent

UNITED STATES PATENTS 2,813,149 Cory ------------------ Nov. 12, 1957